United States Patent
Dellian

(10) Patent No.: US 8,698,398 B2
(45) Date of Patent: Apr. 15, 2014

(54) FUSE FOR A LED FL RETROFIT LAMP, LED FL RETROFIT LAMP, AND METHODS FOR PRODUCING A LED FL RETROFIT LAMP

(75) Inventor: Harald Dellian, Edling (DE)

(73) Assignee: Osram AG, Munich (DE)

( * ) Notice: Subject to any disclaimer, the term of this patent is extended or adjusted under 35 U.S.C. 154(b) by 0 days.

(21) Appl. No.: 13/695,291

(22) PCT Filed: Apr. 18, 2011

(86) PCT No.: PCT/EP2011/056159
§ 371 (c)(1),
(2), (4) Date: Oct. 30, 2012

(87) PCT Pub. No.: WO2011/144404
PCT Pub. Date: Nov. 24, 2011

(65) Prior Publication Data
US 2013/0057147 A1    Mar. 7, 2013

(30) Foreign Application Priority Data
May 21, 2010    (DE) .......................... 10 2010 029 226

(51) Int. Cl.
H01J 7/44    (2006.01)
H01J 13/46   (2006.01)
H01J 17/34   (2006.01)
H01J 19/78   (2006.01)
H01J 23/16   (2006.01)
H01J 29/96   (2006.01)

(52) U.S. Cl.
USPC ............ 315/74; 315/91; 315/185 R; 315/192; 315/289

(58) Field of Classification Search
None
See application file for complete search history.

(56) References Cited

U.S. PATENT DOCUMENTS

| 6,853,151 | B2 * | 2/2005 | Leong et al. ............... 315/185 R |
| 2002/0191393 | A1 | 12/2002 | Chen |
| 2003/0218879 | A1 | 11/2003 | Tieszen |
| 2007/0228999 | A1 * | 10/2007 | Kit ............................... 315/291 |
| 2008/0013324 | A1 | 1/2008 | Yu |
| 2008/0094837 | A1 * | 4/2008 | Dobbins et al. ............... 362/249 |
| 2009/0309518 | A1 | 12/2009 | Frucht |
| 2010/0079075 | A1 | 4/2010 | Son |

FOREIGN PATENT DOCUMENTS

| DE | 202009006236 U1 | 8/2009 |
| WO | 2008014941 A1 | 2/2008 |

* cited by examiner

Primary Examiner — Anh Tran

(57) ABSTRACT

Various embodiments provide a fuse for a light emitting diode fluorescent lamp retrofit lamp, the fuse including a first electrical fuse connecting element for the electrical connection to an electric socket connecting element of a socket of the light emitting diode fluorescent lamp retrofit lamp; and a second electrical fuse connecting element for the electrical connection to a driver of the light emitting diode fluorescent lamp retrofit lamp; wherein the first fuse connecting element is designed as a connecting pin which is provided and equipped for a rigid connection to the socket connecting element.

14 Claims, 3 Drawing Sheets

FUSE FOR A LED FL RETROFIT LAMP, LED FL RETROFIT LAMP, AND METHODS FOR PRODUCING A LED FL RETROFIT LAMP

RELATED APPLICATIONS

The present application is a national stage entry according to 35 U.S.C. §371 of PCT application No.: PCT/EP2011/056159 filed on Apr. 18, 2011, which claims priority from German application No.: 10 2010 029 226.5 filed on May 21, 2010.

TECHNICAL FIELD

Various embodiments relate to a fuse for an LED FL retrofit lamp, i.e. a lamp which is provided to replace a conventional fluorescent lamp (FL), and for this purpose includes at least the same electrical connections and at least a similar outer contour (retrofit lamp) and light-emitting diodes (LEDs) as the light source(s). The fuse includes a first electrical connecting element ('first fuse connecting element') for electrical connection to an electrical connecting element ('socket connecting element') of a socket of the LED FL retrofit lamp and a second electrical connecting element ('second fuse connecting element') for electrical connection to a driver of the LED FL retrofit lamp. Various embodiments also relate to an LED FL retrofit lamp, including at least one light-emitting diode, a driver for driving the at least one light-emitting diode, a socket for connecting the driver to a power supply and an electric fuse arranged electrically between the driver and the socket. Various embodiments also relate to methods for producing an LED FL retrofit lamp.

BACKGROUND

With LED FL retrofit lamps the driver is usually located on the lateral ends next to the sockets. The driver is designed so as to be as small as possible to achieve as much space as possible for the LEDs on its length. The components required for the driver are accommodated on a printed circuit board for this purpose. A compact design of the driver has previously been achieved in this connection by way are known as "mobile components" in which one connecting leg is soldered into the printed circuit board and the other connecting leg is electrically connected by means of a cable. Such a construction is mechanically critical and afflicted by large mechanical tolerances in mass production. Similarly, there is the risk of it not being possible to maintain a quality standard.

SUMMARY

Various embodiments at least reduce the drawbacks of the prior art and even eliminate them, and e.g. provide a compact and reliable LED FL retrofit lamp.

It is the object of the present invention to at least reduce the drawbacks of the prior art and even eliminate them, and in particular to provide a compact and reliable LED FL retrofit lamp.

Various embodiments provide a fuse for an LED FL retrofit lamp, including a first electrical fuse connecting element for the electrical connection to an electric socket connecting element of the socket of the LED FL retrofit lamp and a second electrical fuse connecting element for the electrical connection to a driver of the LED FL retrofit lamp, wherein the first fuse connecting element is designed as a connecting pin which is provided and equipped for a rigid connection to the socket connecting element.

This fuse ensures a mechanical connection of the fuse to the LED FL retrofit lamp which is not susceptible to faults. An electrical connection to the socket which is otherwise required in production is unnecessary as a result of this construction. Typical mechanical tolerances can be maintained without problems. The arrangement of the fuse directly on the socket enables a compact construction to be maintained.

One embodiment is that the first fuse connecting element is designed as a connecting pin provided with an external thread. The fuse can consequently be screwed to the socket, for example to the socket connecting element, so with a straightforward construction the fuse is rotation-proof and mechanically loadable.

The fuse can be replaced, for example by unscrewing the fuse, or be non-replaceable, for example by means of additional use of an adhesive.

A further embodiment is that the first fuse connecting element or connecting pin includes at least one collar, in particular a collar encircling the connecting pin. The collar assists in positioning and securing the connecting pin on/to the socket when the connecting pin is molded on the socket. The connecting pin is in electrical contact with the socket connecting element in this connection. The connecting pin may in particular be introduced or inserted in the connecting element of the socket, in particular up to the collar. The fuse may therefore be connected to the socket or the socket connecting element in a mechanically loadable manner.

A further embodiment is that the first fuse connecting element includes at least one rotation protection element, for example a non-encircling protrusion that projects laterally from the connecting pin. During molding of the at least one rotation protection element the fuse is connected to the socket so as to be secured against rotation.

A further embodiment is that the second fuse connecting element is designed as a connecting wire. This can be connected to the driver particularly easily and securely. Since the connecting wire can also be bent, compact cable routing may be provided.

Various embodiments provide an LED FL retrofit lamp, including at least one light-emitting diode, a driver for operating the at least one light-emitting diode, one socket for connecting the driver to a power supply and an electric fuse arranged electrically between the driver and the socket, wherein the fuse is (directly) rigidly connected to a socket connecting element.

This LED FL retrofit lamp ensures a secure mechanical connection to the fuse. An electrical connection to the socket which is otherwise required in production is unnecessary as a result of this construction. Typical mechanical tolerances can be maintained without problems. The arrangement of the fuse directly on the socket enables a compact construction to be maintained.

One embodiment is that the fuse is a fuse provided with a screw thread, for example external thread, and the socket connecting element connected to the fuse includes a suitable mating thread, for example internal thread, wherein the connecting pin of the first fuse connecting element is screwed to the socket connecting element, in particular screwed into it.

An alternative or additional embodiment is that the first fuse connecting element includes at least one collar and the first fuse connecting element is molded with the socket. The collar may be molded alongside for the purpose of positioning and fixing. For this purpose the first fuse connecting element in particular may be introduced into the socket connecting element, connected to the fuse, substantially up to the collar.

The socket may in particular be a type T5 or T8 socket.

The LED FL retrofit lamp may basically be designed (for example shaped and dimensioned) to replace any FL lamp, for example to replace a three-band lamp or a compact fluorescent tube.

Various embodiments provide a method for producing an LED FL retrofit lamp, wherein a fuse connecting element is screwed to a socket connecting element of the LED FL retrofit lamp.

Various embodiments provide a method for producing an LED FL retrofit lamp, wherein a fuse connecting element, which is in electrical contact with a socket connecting element of the LED FL retrofit lamp, is molded with the socket.

The fuse connecting element may in particular be injection molded with the socket. Injection molding, in particular plastic injection molding, provides a simple, inexpensive and reliable type of molding. The fuse may be molded with the socket following production of the socket or at the same time as the socket is produced. A plastic housing of the socket may in particular be molded with the fuse.

The use of both methods is also possible, for example screwing and subsequent molding.

BRIEF DESCRIPTION OF THE DRAWINGS

The invention will be schematically described in more detail in the following figures with the aid of exemplary embodiments. Identical elements or elements with the same function can be provided with identical reference numerals for clarity.

DETAILED DESCRIPTION

The following detailed description refers to the accompanying drawings that show, by way of illustration, specific details and embodiments in which the invention may be practiced.

Figure 1:
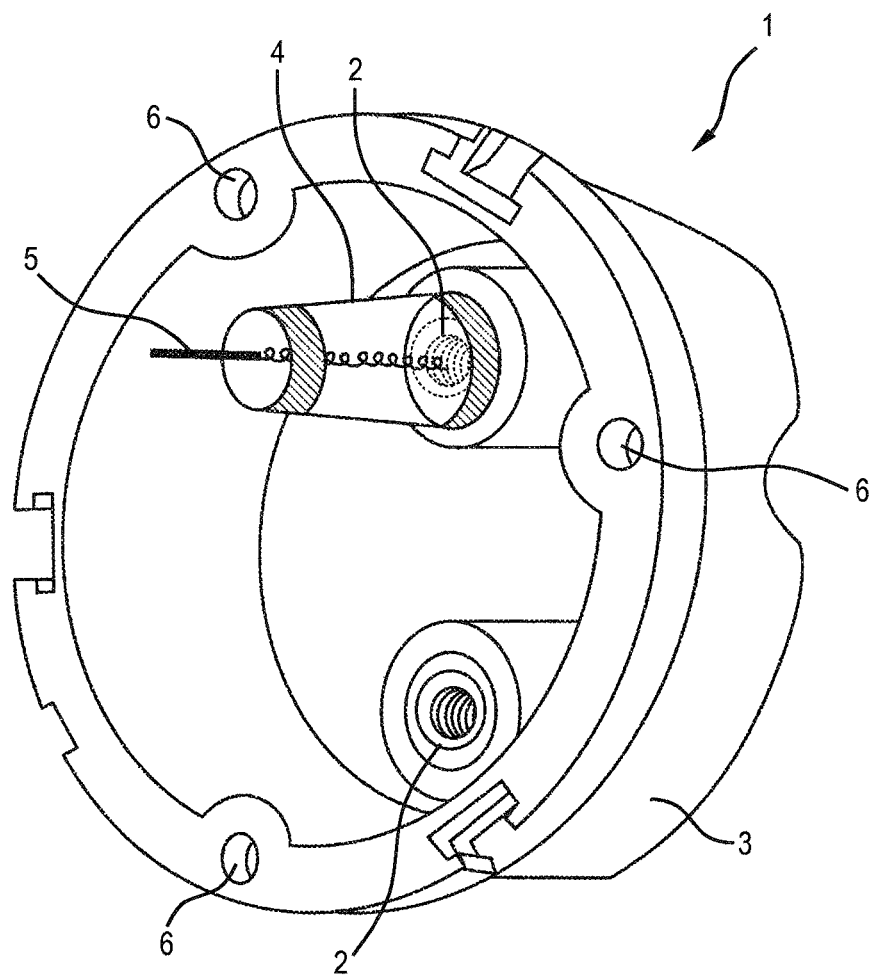
FIG. 1 shows, in an oblique view of its inside, a socket of an LED FL retrofit lamp.

FIG. 1 shows, in an oblique view of its inside, a T8 type socket 1 of an LED FL retrofit lamp. The socket 1 may be pushed with its illustrated side onto a bulb of the LED FL retrofit lamp, wherein a driver (top figure) is in an assembled state close to the socket 1. The driver feeds one or more light-emitting diode(s) (top figure) of the LED FL retrofit lamp and is connected to the socket 1 for its supply. The socket 1 may in turn be pushed into a suitable holder and for this purpose includes two connecting pins 2 in a plastic housing 3.

A fuse 4 is rigidly fixed at an inside of the connecting pins 2, so the driver may be contacted firstly at a connecting wire 5 of the fuse 4 and secondly at the other of the two connecting pins. The fuse 4 is therefore connected in series to the driver.

The socket 1 may be connected by way of example by screw holes 6 to a bulb (top figure) of the LED FL retrofit lamp.

This embodiment has the advantage inter alia that firstly the electrical fuse 4 can be fixed mechanically securely and without high tolerances to the socket 1. Furthermore, the compact construction of the LED FL retrofit lamp is maintained by the position of the fuse 4 in a previously unused space between the socket 1 and the driver.

Figure 2:
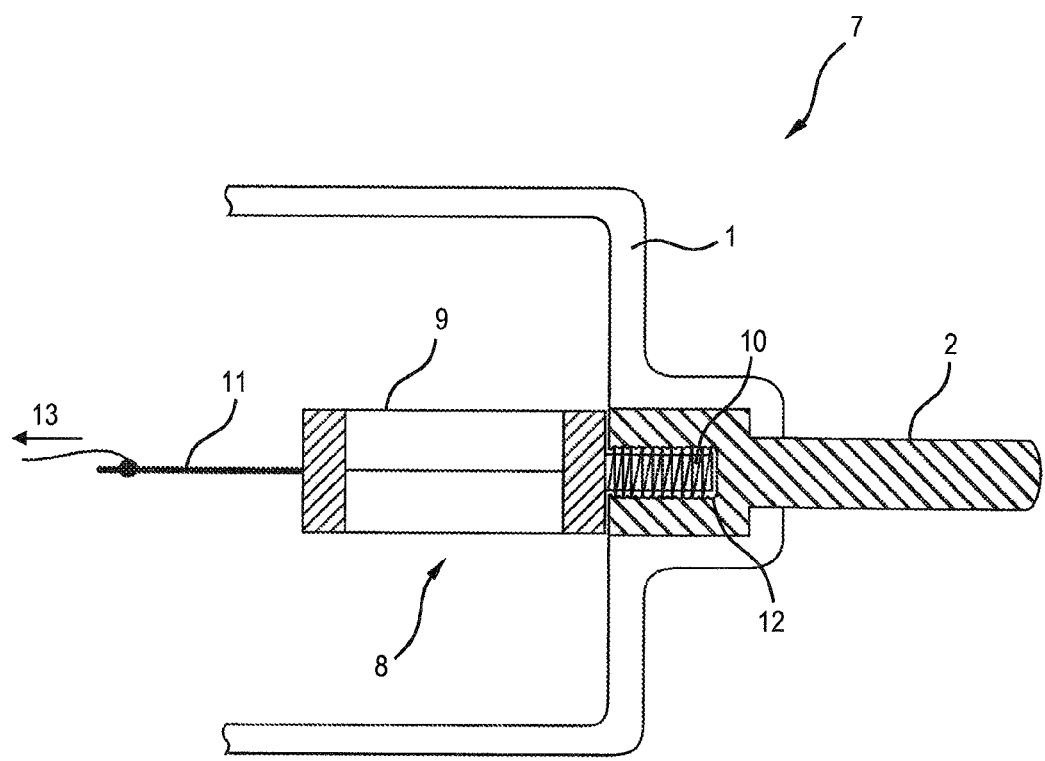
FIG. 2 shows in a side view a detail of an LED FL retrofit lamp with a fuse according to a first embodiment.

FIG. 2 shows in a side view a detail of an LED FL retrofit lamp 7 with an electrical fuse 8 according to a first embodiment. The fuse 8 includes a fuse housing 9 on which connecting elements 10, 11 (fuse connecting elements) are provided on both sides. The fuse housing 9 may include a glass tube or be manufactured using plastic. A first fuse connecting element 10, which is shown on the right here, has the form of a connecting pin provided with an external thread, while a second fuse connecting element 11 arranged on the opposing side is designed in the form of a connecting wire.

The first fuse connecting element 10 has been screwed into an internal thread 12 on an inside end of one of the two connecting pins 2, while a cable or a printed circuit board of the driver 13 has been soldered to the second fuse connecting element 11, as is indicated by the arrow. The fuse 8 can be removed by unscrewing it from the fuse pin 2 and be replaced for example, if this is not prevented, for example due to gluing or overmolding.

Figure 3:
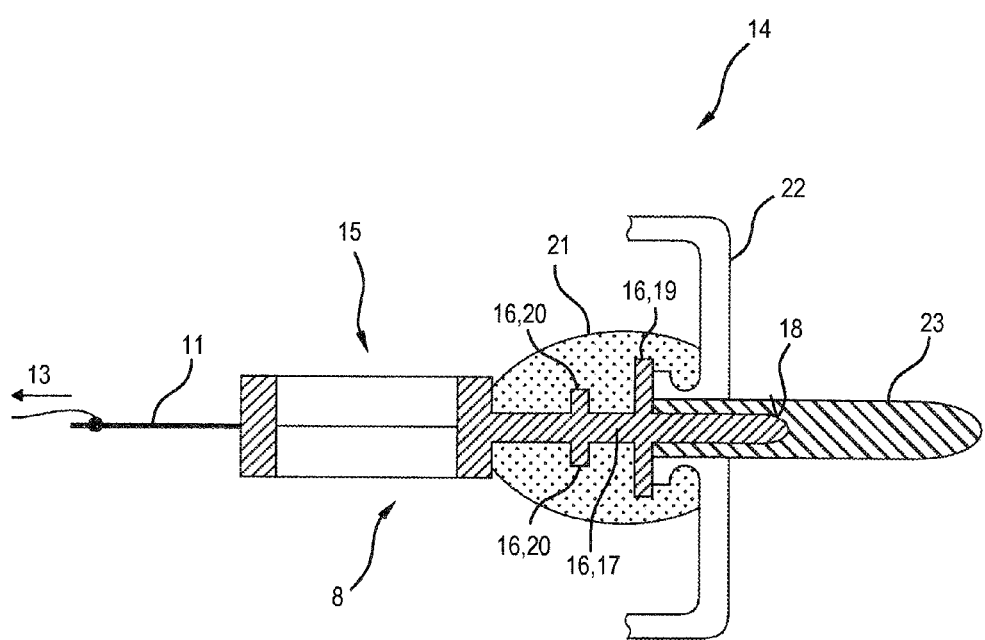
FIG. 3 shows in a side view a detail of an LED FL retrofit lamp with a fuse according to a second embodiment.

FIG. 3 shows in a side view of a detail of an LED FL retrofit lamp 14 with an electrical fuse 15 according to a second embodiment.

The fuse 15 includes the fuse housing 9 on which fuse connecting elements 16, 11 are provided on both sides. A first fuse connecting element 16, which is shown on the right here, has the form of a connecting pin 17, while the second fuse connecting element 11 arranged on the opposing side is designed in the form of the connecting wire.

The connecting pin 17 of the fuse connecting element 16 may be pushed into a suitable recess 18 on an inside end of one of the two connecting pins 23 of the socket 22 and then be molded by means of a casting compound 21, preferably made of plastic, with the socket 22, in particular injected onto the socket 22. The connecting pin 17 includes a laterally encircling collar 19 to set the penetration depth of the connecting pin 17 and for fixing. The connecting pin 17 also includes rotation protection 20 which prevents the electrical fuse 15 from being removed from the casting compound due to mechanical applications of force. The rotation protection 20 also includes pin-type moldings which extend laterally outwards in two directions. This fuse 15 cannot be easily replaced. The fuse 15 can, however, optionally be renewed along with the casting compound 21.

The present invention is obviously not restricted to the illustrated exemplary embodiments.

The connecting pin 2 and the fuse 4, 8 or 15, etc. can therefore also be designed in one piece. A marriage of these two parts can be dispensed with as a result and a particularly rigid and secure connection created.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

LIST OF REFERENCE NUMERALS 1 socket
2 connecting pin
3 plastic housing
4 electrical fuse
5 connecting wire
6 screw hole
7 LED FL retrofit lamp
8 electrical fuse
9 fuse housing 10 first fuse connecting element
11 second fuse connecting element
12 internal thread
13 driver
14 LED FL retrofit lamp
15 electrical fuse
16 first fuse connecting element
17 connecting pin
18 recess
19 collar
20 rotation protection
21 casting compound
22 socket
23 connecting pin

The invention claimed is:

1. A fuse for a light emitting diode fluorescent lamp retrofit lamp, the fuse comprising
a first electrical fuse connecting element for the electrical connection to an electric socket connecting element of a socket of the light emitting diode fluorescent lamp retrofit lamp; and
a second electrical fuse connecting element for the electrical connection to a driver of the light emitting diode fluorescent lamp retrofit lamp;
wherein
the first fuse connecting element is designed as a connecting pin which is provided and equipped for a rigid connection to the socket connecting element.

2. The fuse as claimed in claim 1,
wherein the first fuse connecting element is designed as a connecting pin provided with an external thread.

3. The fuse as claimed in claim 1,
wherein the first fuse connecting element comprises at least one collar.

4. The fuse as claimed in claim 3,
wherein the first fuse connecting element comprises at least one rotation protection element.

5. The fuse as claimed in claim 1,
wherein the second electrical connecting element is designed as a connecting wire.

6. A light emitting diode fluorescent lamp retrofit lamp, comprising:
at least one light-emitting diode;
a driver configured to operate the at least one light-emitting diode;
a socket configured to connect the driver to a power supply; and
an electric fuse arranged electrically between the driver and the socket;
wherein the fuse is connected directly to an electrical socket connecting element of the socket.

7. The light emitting diode fluorescent lamp retrofit lamp as claimed in claim 6,
the fuse comprising:
a first electrical fuse connecting element for the electrical connection to an electric socket connecting element of the socket of the light emitting diode fluorescent lamp retrofit lamp; and
a second electrical fuse connecting element for the electrical connection to the driver of the light emitting diode fluorescent lamp retrofit lamp;
wherein the first fuse connecting element is designed as a connecting pin which is provided and equipped for a rigid connection to the socket connecting element;
wherein the first fuse connecting element is designed as a connecting pin provided with an external thread;
wherein the electrical socket connecting element of the socket connected to the fuse comprises an internal thread,
wherein the first fuse connecting element is screwed into the socket connecting element.

8. The light emitting diode fluorescent lamp retrofit lamp as claimed in claim 6,
the fuse comprising:
a first electrical fuse connecting element for the electrical connection to an electric socket connecting element of the socket of the light emitting diode fluorescent lamp retrofit lamp; and
a second electrical fuse connecting element for the electrical connection to the driver of the light emitting diode fluorescent lamp retrofit lamp;
wherein the first fuse connecting element is designed as a connecting pin which is provided and equipped for a rigid connection to the socket connecting element;
wherein the first fuse connecting element comprises at least one collar;
wherein the first fuse connecting element is molded with the socket.

9. The light emitting diode fluorescent lamp retrofit lamp as claimed in claim 8,
wherein the first electrical connecting element of the fuse is introduced into the electrical socket connecting element of the socket substantially up to the collar.

10. The light emitting diode fluorescent lamp retrofit lamp as claimed in claim 6,
which is designed as a three-band lamp or as a compact fluorescent tube.

11. The light emitting diode fluorescent lamp retrofit lamp as claimed in claim 6,
wherein the electric fuse and the socket connecting element connected to the fuse are configured in one piece.

12. A method for producing a light emitting diode fluorescent lamp retrofit lamp, the method comprising:
screwing a fuse connecting element of a fuse to an electrical socket connecting element of a socket of the light emitting diode fluorescent lamp retrofit lamp.

13. A method for producing an light emitting diode fluorescent lamp retrofit lamp, the method comprising:
molding an electrical first connecting element of a fuse, which is in electrical contact with an electrical socket connecting element of a socket of the light emitting diode fluorescent lamp retrofit lamp, with the socket.

14. The method as claimed in claim 13, further comprising Injection molding the first fuse connecting element of the fuse with the socket.

* * * * *